Sept. 26, 1944.  J. A. RICHEY ET AL  2,359,156
POWER TRANSMISSION
Filed Aug. 18, 1943  2 Sheets-Sheet 1
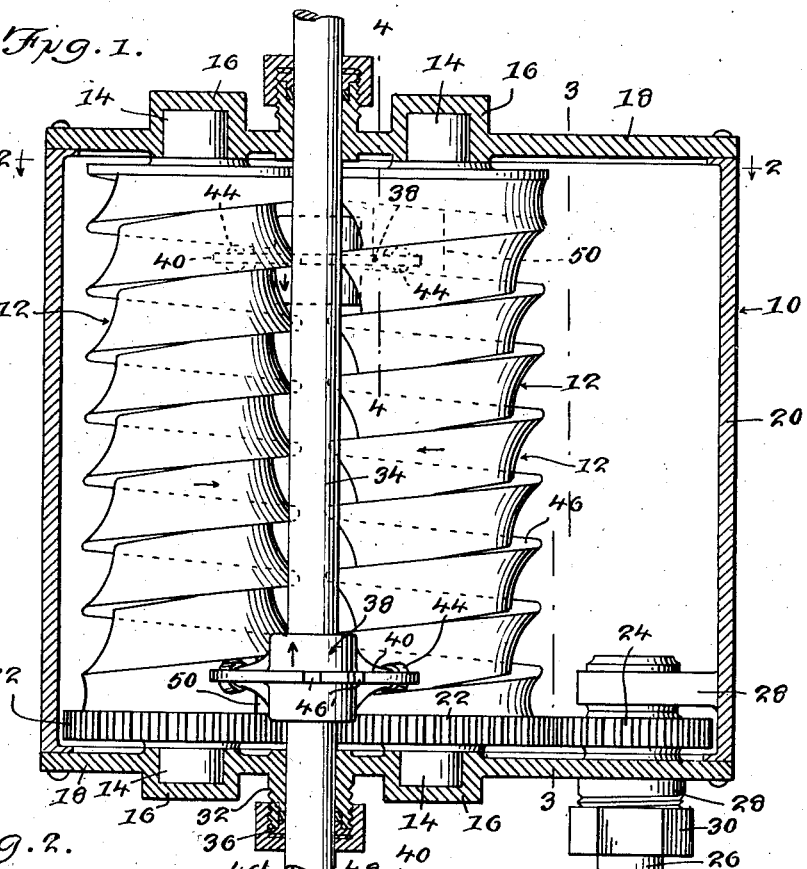
James A. Richey
Archie N. Buchanan
INVENTOR.
BY
Victor J. Evans & Co.
ATTORNEYS Sept. 26, 1944.  J. A. RICHEY ET AL  2,359,156
POWER TRANSMISSION
Filed Aug. 18, 1943  2 Sheets-Sheet 2

James A. Richey
Archie N. Buchanan
INVENTOR.

BY
Victor J. Evans & Co.
ATTORNEYS

Patented Sept. 26, 1944

2,359,156

UNITED STATES PATENT OFFICE 2,359,156

POWER TRANSMISSION

James A. Richey and Archie N. Buchanan, Ocala, Fla.

Application August 18, 1943, Serial No. 499,128

5 Claims. (Cl. 74—58)

Our invention relates to power transmission devices, and has among its objects and advantages the provision of a novel device for converting rotary motion into reciprocatory motion.

In the accompanying drawings:

Figure 1 is a top plan view of the invention with the housing illustrated in section.

Figure 2 is a sectional view along the line 2—2 of Figure 1.

Figure 3:
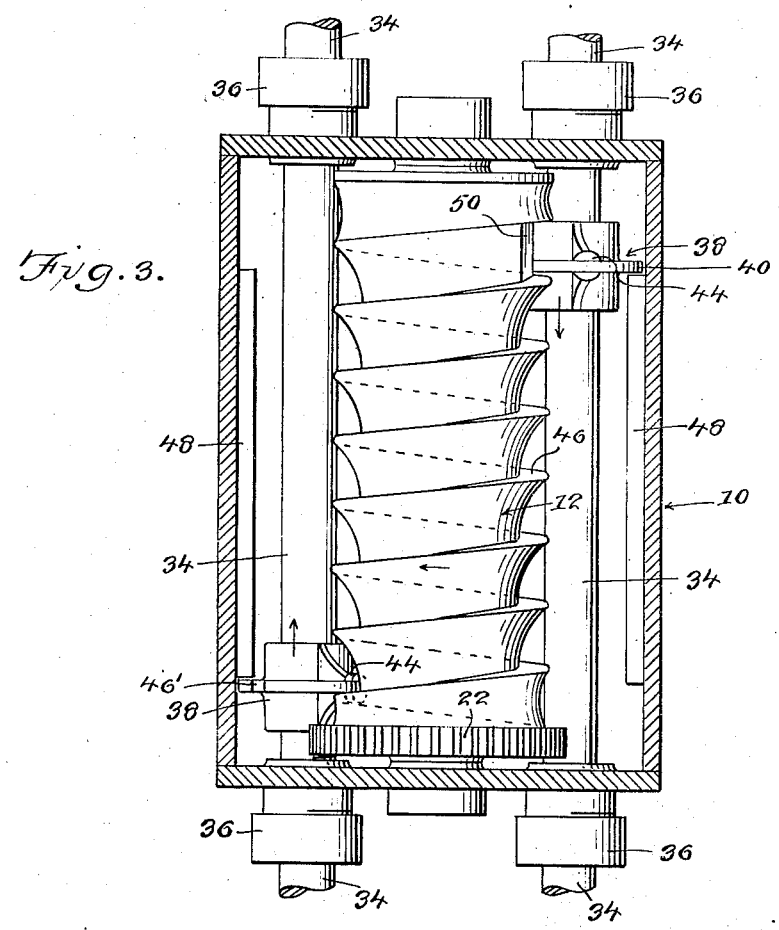
Figure 3 is a sectional view along the line 3—3 of Figure 1.
Figure 4:
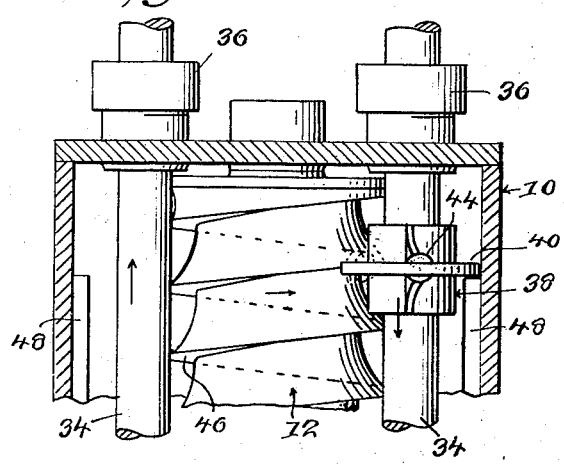
Figure 4 is a sectional view along the line 4—4 of Figure 1.
Figure 5:
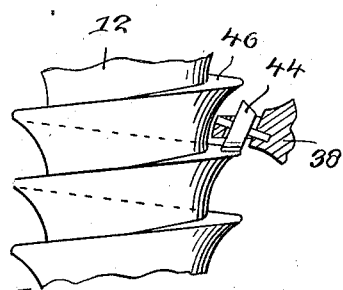
Figure 5 is a detail view of a cam roller.

In the embodiment of the invention selected for illustration, we make use of a housing 10 within which are mounted two parallel worms 12. These worms are provided with shafts 14 rotatably supported in bearings 16 formed on end covers 18 detachably connected with the body 20 of the housing 10. Each worm 12 has a gear 22 fixed thereto, as in Figures 1 and 2, the two gears 22 being in mesh one with the other.

A pinion 24 is in mesh with one of the gears 22, and is fixedly connected with a drive shaft 26 rotatably supported in a bearing 28 on one of the covers 18. This bearing may be provided with a stuffing nut 30 to seal lubricant in the housing.

Slidably mounted in bearings 32 on the respective covers 18 are two reciprocated shafts 34 lying in a plane at right angles to the plane of the worms. These shafts parallel the axes of the worms 12 and are located on opposite sides thereof. Stuffing nuts 36 are provided for the bearings 32. The shafts 34 constitute power take-offs for operating pumps or other devices (not shown).

Fixed to each shaft 34 is a cam unit 38 which includes a flange 40 arranged at right angles to the shaft 34 and provided with openings 42 for accommodating cam rollers 44, there being one cam roller 44 for each worm 12. Each worm includes a cam race or spiral surface 46 which coacts with one of the cam rollers 44 to move the shaft 34 in one direction. The cam races 46 are reversed, so that the shaft 34 is moved in one direction by one worm and in the return direction by the other worm, but the two shafts 34 move simultaneously in opposite directions.

In Figure 2, each flange 40 is provided with two grooves 46'. A rib 48 is fixed to one wall of the body 20 for each flange 40, to enter one groove 46' as the shaft 34 slides in one direction and to then enter the other groove as the shaft starts on its return trip.

The shafts 34 are oscillated when their cam units 38 reach the ends of the worms 12, to bring one cam roller 44 into engagement with its respective cam race 46 as the other cam roller is shifted radially from its worm. When viewing Figure 2, the pinion 24 rotates counterclockwise to impart clockwise rotation to the worm 12 having its gear 22 meshing with the pinion. Such rotation of this gear 22 imparts counterclockwise rotation to the other gear 22 and its attached worm.

Each worm 12 is provided with a throw out ledge 50 at one end. The ledges 50 are located at the delivery ends of their respective worms 12 to impart turning movement to the cam units 38 and their attached shafts 34 as the longitudinal travel of the shafts are completed in one direction to bring the cam rollers at the other ends of the units 38 into camming engagement with their respective cam races 46. The ribs 48 are of such length as to provide clearance which accommodates oscillatory motion of the cam units 38 at the ends of the respective worms 12.

As the cam units 38 reach their limit of travel in each direction, the cam units are pivoted by one throw out ledge 50 to bring the cam rollers 42 at the other ends of the units into full camming engagement with the cam races 46 on the other worm. Thus the cam units are positively pivoted during the change-over. As the change-over is made, the cam units start on their return travel and are held against counterrotation until the ribs 48 enter one of the grooves 46'. Thus the cam units are positively restrained from rotation except when the change-overs are made at the ends of the worms.

Without further elaboration, the foregoing will so fully explain our invention, that others may, by applying current knowledge, readily adapt the same for use under various conditions of service.

We claim:

1. A motion converting device comprising a support, two worms rotatably mounted on said support, rotative means for imparting reversed rotary motion to said worms, a work member lying parallel to said worms and mounted for oscillation and reciprocation relatively to said support, cam means fixedly related to said work member selectively engageable with said worms to impart reciprocatory motion to the work member, means on the respective worms for oscillating said cam means and said shaft at one end of each worm to shift said cam means from one worm to the other means on said support engaging the cams to restrain said cam means and the work member from oscillation during the reciprocatory travel of the work member.

2. The invention described in claim 1 wherein a guide rib is fixedly related to said support, and in which said cam means is provided with grooves selectively receiving said rib during reciprocatory travel of said work member to restrain the latter from oscillation.

3. A motion converting device comprising a support, two parallel worms mounted for rotation on said support, said worms having spiral races reversed with respect to each other, rotative means for imparting rotary motion to said worms, a work member lying parallel to said worms and mounted for oscillation and reciprocation relatively to said support, cam means fixedly related to said work member selectively engageable with said races to impart reciprocatory motion to said work member, and means at one end of each worm selectively coacting with said cam means to oscillate the latter and said work member to shift the cam means from one worm to the other wherein said cam means is provided with two grooves, and a guide rib fixedly related to said support and selectively receivable in said grooves to restrain the cam means and said work member from oscillation during reciprocatory travel of the work member.

4. A motion converting device comprising a housing, two parallel worms rotatably mounted in said housing, meshing gears fixedly related to the respective worms, a rotative drive shaft having a gear meshing with one of said gears to impart rotation to said worms, said worms rotating in opposite directions and each being provided with a spiral race, a reciprocatory power take-off shaft mounted for oscillation and reciprocation relatively to said housing, a cam unit fixedly related to said shaft and having cam rollers selectively engageable with said races to impart reciprocatory motion to the shaft, a throw out ledge at one end of each worm arranged to shift said cam unit to move one cam roller from its worm and to bring the other cam roller into engagement with its worm, said cam unit being provided with two grooves, and a rib fixed to said housing and selectively receivable in said grooves to restrain the cam unit and said shaft from oscillation during reciprocatory travel of the shaft.

5. A motion converting device comprising a housing formed with side and end walls, two parallel worms rotatably mounted in the housing, intermeshing gears fixedly related to the respective worms, a drive shaft having a gear meshing with one of said gears to impart rotation to said worms, said worms rotating in opposite directions and each provided with a spiral race, reciprocatory power take-off shafts mounted for oscillation and reciprocation relative to said housing, a cam unit fixed to each shaft and having cam rollers selectively engageable with said races to impart reciprocatory motion to the shaft, a throw out ledge at one end of each worm arranged to shaft said cam unit to move one cam roller from its worm and to bring the other cam roller unit engagement with its worm, said shafts and cam units being reversely reciprocated simultaneously throughout the greater extents of their travel, each cam unit provided with a pair of grooves, a rib on each side wall of the housing adjacent each cam unit, and each rib selectively engaging in said grooves in its adjacent cam unit to restrain the cam unit and said shaft from oscillation during reciprocatory travel of the shaft.

JAMES A. RICHEY.
ARCHIE N. BUCHANAN.